United States Patent [19]
Walser

[11] 3,768,836
[45] Oct. 30, 1973

[54] KINGPIN COUPLING FOR TRACTOR SCRAPER

[75] Inventor: Melvin L. Walser, Lubbock, Tex.

[73] Assignee: Clark Equipment Company, Buchanan, Ind.

[22] Filed: Sept. 29, 1972

[21] Appl. No.: 293,728

[52] U.S. Cl................... 280/492, 287/87, 287/100, 180/79.2 B, 280/446
[51] Int. Cl............................................. B62d 53/02
[58] Field of Search................... 280/461, 400, 492; 180/79.2 B, 52, 53, 14; 287/87, 100; 172/448

[56] References Cited
UNITED STATES PATENTS

| | | | |
|---|---|---|---|
| 3,135,529 | 6/1964 | Conrad | 180/52 X |
| 3,134,628 | 5/1964 | Lackey | 180/79.2 B X |
| 3,032,135 | 5/1962 | McAdams | 180/79.2 B R |
| 3,118,686 | 1/1964 | McAdams | 180/52 X |

*Primary Examiner*—Leo Friaglia
*Assistant Examiner*—Randall A. Schrecengost
*Attorney*—Kenneth C. Witt et al.

[57] ABSTRACT

A kingpin coupling having an upper kingpin and a lower pintle connection on a vertical axis and being pivotally mounted at the bottom on a longitudinal axis, the pintle having a spherical bearing portion permitting quick attachment at the lower end and then subsequent alignment in the vertical axis for insertion of the kingpin by rotating the coupling about the longitudinal axis.

6 Claims, 2 Drawing Figures

Patented Oct. 30, 1973

3,768,836

KINGPIN COUPLING FOR TRACTOR SCRAPER

BACKGROUND OF THE INVENTION

1. Field of the Invention

The invention pertains to the art of articulated vehicles and more particularly to off-highway vehicles such as a self-propelled elevating tractor scraper steered by turning the tractor relative to the scraper using steering jacks located on each side between the vehicle sections.

2. Description of the Prior Art

Articulated tractor scrapers will, in the case of a two-wheeled, over-hung, tractor, have steering jacks, one on each side, which effect turning movement of the tractor relative to the scraper about a vertical turning axis between the vehicle sections. The tractor and scraper will be coupled by a kingpin coupling having a pivotal connection at its lower end with the tractor frame, this connection being on the longitudinal axis of the tractor and permitting the tractor to oscillate or roll relative to the scraper. In addition the kingpin coupling will have vertically spaced, upper and lower bushings adapted to be aligned with upper and lower bores in the scraper yoke for insertion of upper and lower kingpins.

It has often proved a time consuming operation to connect a tractor and scraper because of the difficulty in aligning both the upper and lower kingpin bushings and bores. As will be appreciated, a two-wheeled, over-hung tractor, when not attached to the scraper requires some temporary support at the front to maintain it level and position it while mounting the scraper. In addition, the kingpin coupling will swivel on its lower longitudinal axis and requires lateral support when mounting the scraper. With both fore and aft and side to side adjustment of the kingpin coupling to contend with, usually considerable trial and error is required before alignment of the kingpin bores occurs so that the kingpins may be inserted.

SUMMARY OF THE INVENTION

A kingpin coupling is provided having a mast pivotally mounted at its lower end on a longitudinal axis, and having at one of two vertically aligned mounting locations, a spherical bearing portion permitting limited pivotal motion of the mast about the longitudinal axis for quick alignment of the other mounting location with minimum adjustment in a fore and aft direction required.

More specifically in the case of a two-wheeled, over-hung tractor the mast is pivotally connected at its lower end to the tractor trunnion permitting side-to-side tilting of the mast on the longitudinal axis of the trunnion. A pintle projects upwardly from a horizontal base structure of the mast having the spherical bearing portion at its upper end which provides the lower mounting location for the scraper. A clevis projects rearwardly from the upper portion of the mast providing the upper mounting location for the scraper. The scraper will have upper and lower draft connections, the upper having a bore alignable with a bore in the clevis and the lower providing a cap having a blind socket for receiving the spherical bearing portion of the pintle.

Especially in the case of a tractor scraper, there is provided a method of attachment wherein the yoke of the scraper is extended at approximately right angles to the tractor. The lower draft connection or cap on the scraper yoke will be lifted onto the pintle bearing. The mast will then be swiveled toward the upper draft connection on the yoke until the kingpin bores are aligned.

One of the principal aspects of the invention is that freedom of motion in the kingpin coupling about its longitudinal axis is used, once the lower pintle connection is made, to establish alignment of the upper kingpin bores by rotation of the mast.

Another advantage seen had by the invention is the provision of a kingpin coupling which is much simpler and quicker to couple than the prior art which required aligning two kingpins simultaneously on the vertical axis.

Still another advantage of the invention is the elimination of seals, plates, and other parts needed for the lower kingpin in prior art couplings. Also because the lower draft attachment includes a cap structure having a blind ball socket, a lubrication reservoir is obtained greatly extending the lubrication period.

These and other advantages will be more apparent by referring to the following detailed description which proceeds with a description of the drawings wherein

DESCRIPTION OF THE PREFERRED EMBODIMENT

Figure 1:
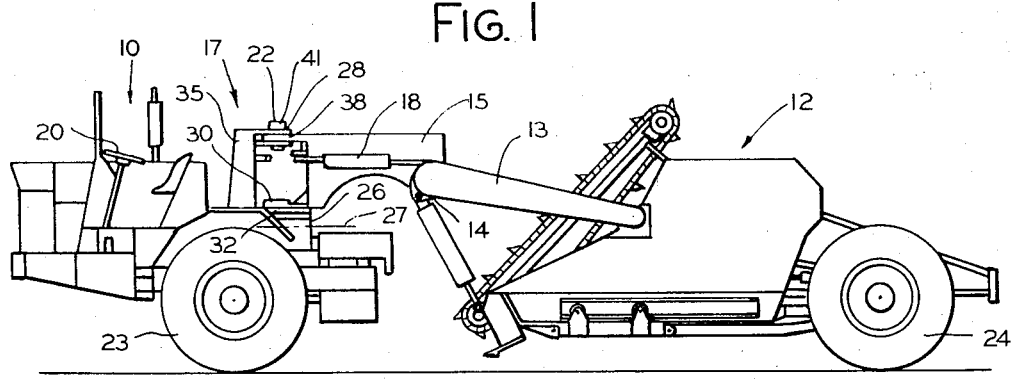
FIG. 1 is a side elevational view of a tractor scraper having a kingpin coupling according to the invention.

FIG. 1 shows a two-wheeled, over-hung tractor 10 towing a two-wheeled scraper 12. The scaper 12 has a pair of arms 13 connected at the forward ends by a cross beam 14 at the center of which is attached a draft member or yoke 15 which extends forwardly for mounting on the tractor 10 by means of a kingpin coupling 17. A pair of steering jacks 18, one on each side of the yoke 15, is controlled by a steering valve (not shown) operated by the steering wheel 20 on the tractor for effecting turning movements of the tractor relative to the scraper about the vertical kingpin axis 22, it being understood that the operator on the tractor 10 steers by turning the wheel 20 causing the jacks 18 to be extended or retracted in a known manner.

It will also be understood that while a tractor and scraper are illustrated, the kingpin coupling 17 is not restricted to this class or type of vehicle, but may be applicable to articulated vehicles generally.

The tractor 10 is supported on wheels 23 and the scraper 12 on wheels 24 at the rear. Neither the tractor 10 nor the scraper 12 are capable of independent level support absent the kingpin coupling 17; that is, the vehicle sections are incapable of mobility independently of each other. When coupled together, they will be required to have at least two degrees of movement, one in a vertical plane, when pivoting about the kingpin axis and the other in a horizontal plane when pivoting or oscillating about a longitudinal axis through the lower portion of the kingpin coupling 17. In the case of the tractor scraper in FIG. 1, the kingpin coupling 17 is pivotally mounted on a trunnion 26 supported on the tractor frame having a trunnion axis 27 extending generally longitudinally of the tractor 10.

Figure 2:
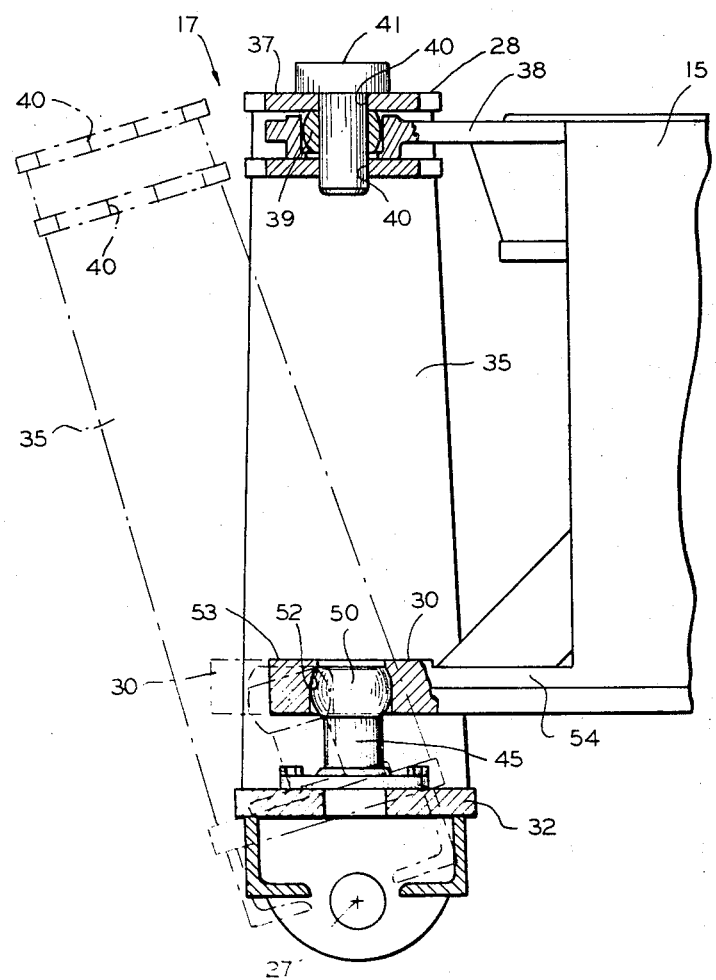
FIG. 2 is a partial view of the tractor scraper showing the kingpin coupling with portions broken away at the upper and lower mounting locations as viewed along the trunnion axis of the tractor with the scraper yoke positioned at an angle to the right and depicting in dot-dash lines the mast swiveled to the left as would be the case, according to the coupling method of the invention, in preparation for rotating the mast to the upright position for insertion of the kingpin.

As shown in FIGS. 1 and 2, the kingpin coupling 17 has an upper mounting location 28 and a lower mounting location 30. A mast 35 has a horizontal lower base 32 at the lower mounting location and a clevis 37 extends rearwardly from the upper end of the mast at the upper mounting location. An upper draft attachment 38 extends forwardly from the yoke 15 having a bushing 39 which may be aligned with the bores 40 in the clevis allowing insertion of a kingpin 41 as described hereinafter for establishing the draft connection at the upper mounting location.

The connection at the lower mounting location is provided by a pintle 45 which projects upwardly from the base 32 in alignment with the bores 40 in the clevis 37. In accordance with the invention the upper portion of the pintle 45 has a spherical bearing portion 50 which is adapted to be received in a ball or spherical socket portion 52 formed in a cap 53 supported on a lower draft attachment 54 extending forwardly from the yoke 15. As viewed in FIG. 2, the tractor 10 is disposed at about 90° to the scraper 12 such that the yoke 15 is nearly perpendicular to the trunnion axis 27. In other words, the view is taken at the rear of the tractor with the scraper positioned off at the right side.

It is important to note that it is unnecessary to elevate the front of the tractor to establish the lower mounting connection. The ball and socket type connection allows the mast 35 to be leaned to one side as depicted in the dot-dash lines in FIG. 2 while positioning the lower draft attachment 54. The yoke is simply lifted so that the cap 53 can be set down on the pintle 45. In making the upper connection, it is then only necessary to bring the clevis bores 40 into alignment with the bushing 39 for insertion of the kingpin 41. This is accomplished much more rapidly in the present arrangement since the mast 35 can be rotated about the trunnion axis 27 while connected at the lower mounting location 30. The spherical bearing 50 may be a standard one-piece spherical type or a two-piece steep angle type.

It will also be appreciated that a novel method of attachment for tractor scrapers is provided which eliminates the necessity of aligning upper and lower kingpins in two directions at once. Thus the lower mounting connection may be established without independently supporting the tractor or if any support is required, only a slight jacking of the front end of the tractor will readily permit setting the cap 53 on the upper end of the pintle. It is then only a matter of aligning the bores in the upper connection and this is greatly simplified by the fact that the swivelling motion of the mast 35 is at right angles to the yoke.

Having thus described a preferred embodiment of the present invention, it will, of course, be understood that various changes may be made in the form, details, arrangement and proportion of the parts without departing from the scope of the invention which consists of the matter shown and described herein and set forth in the appended claims.

I claim:

1. A kingpin coupling for an articulated vehicle having a plurality of vehicle sections, one being pivotally connected to the other on a longitudinal axis and also on a vertical axis permitting at least two degrees of pivotal motion, said coupling comprising a mast pivotally mounted at its lower end on the one vehicle section on said longitudinal axis, upper and lower bearing means on said mast for pivotally mounting the other vehicle section on said vertical axis, said upper bearing means having bores for receiving a kingpin and the lower bearing means having a spherical bearing portion permitting the mast to be pivoted on the one vehicle section relative to the other about said longitudinal axis to align said bores for insertion of a kingpin when coupling said vehicle sections.

2. A kingpin coupling according to claim 1 wherein the upper bearing means comprises a clevis and the lower bearing means a pintle, the upper portion of said pintle having a spherical bearing element permitting the clevis to be swiveled on said longitudinal axis for alignment of said bores.

3. A kingpin coupling comprising a rigid mast pivotally mounted at its lower end about a longitudinal axis, upper and lower spaced mounting structures extending rearwardly from the mast above said axis, one having a bore for receiving a kingpin and the other having a pintle aligned with the bore, the upper portion of which includes a spherical bearing element, a draft member attachable to said mast having upper and lower spaced attachment structures, one having a bore alignable with the bore of said mounting structure and the other a cap having an interior socket having a spherical portion adapted to receive the spherical element on said pintle and a kingpin insertable in the bores of said mounting and attachment structures when aligned in a substantially vertical axis.

4. A kingpin coupling according to claim 3 wherein said upper mounting structure on the mast comprises a clevis portion having a vertical bore aligned with said pintle and said upper attachment structure comprises a connecting arm having a bushing in one end received in said clevis and adapted to be aligned with said bores for insertion of the kingpin.

5. A kingpin coupling according to claim 4 wherein said lower mounting structure comprises a horizontal base integral with said mast extending rearwardly therefrom parallel to said clevis and the pintle being secured to said base and projecting upwardly therefrom in vertical alignment with the bores of said clevis and said lower attachment structure including an arm extending parallel to said upper connecting arm having said cap mounted at one end.

6. The method of coupling a two-wheeled tractor and a two-wheeled scraper for relative turning movement about a vertical axis and relative oscillatory movement about a longitudinal axis, said coupling providing upper and lower mounting locations on the tractor receiving upper and lower attachment structures on the scraper and said lower mounting location providing means to permit rotation of said upper mounting location about said longitudinal axis comprising the steps of lifting the lower attachment structure of the scraper into engagement on the lower mounting location on the tractor, pivoting the upper mounting location of the tractor about said longitudinal axis into alignment with the upper attachment structure of the scraper and effecting a connection therebetween when aligned.

* * * * *